US012364998B2

(12) United States Patent
Cavaness

(10) Patent No.: US 12,364,998 B2
(45) Date of Patent: *Jul. 22, 2025

(54) SPRAY GUN AND HOSE COVER

(71) Applicant: Tyler Cavaness, Rockwall, TX (US)

(72) Inventor: Tyler Cavaness, Rockwall, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/241,787

(22) Filed: Sep. 1, 2023

(65) Prior Publication Data

US 2023/0415187 A1 Dec. 28, 2023

Related U.S. Application Data

(62) Division of application No. 16/830,982, filed on Mar. 26, 2020, now Pat. No. 11,745,203.

(51) Int. Cl.
*B05B 12/32* (2018.01)
*B05C 21/00* (2006.01)

(52) U.S. Cl.
CPC ............ *B05B 12/32* (2018.02); *B05C 21/005* (2013.01)

(58) Field of Classification Search
None
See application file for complete search history.

(56) References Cited

U.S. PATENT DOCUMENTS

| | | | |
|---|---|---|---|
| 1,329,409 | A | 2/1920 | Jacobs |
| 1,331,532 | A | 2/1920 | Simonovich |
| 1,345,423 | A | 7/1920 | Waldo |
| 1,354,934 | A | 10/1920 | Woodruff |
| 1,355,083 | A | 10/1920 | Marsh |
| 1,383,680 | A | 10/1920 | Waldorf |
| 1,363,440 | A | 12/1920 | Spicer |
| 1,387,348 | A | 8/1921 | Burgstresser |
| 1,389,868 | A | 9/1921 | Guy |
| 1,406,086 | A | 2/1922 | Rudolth |
| 1,408,529 | A | 5/1922 | Malo, Jr. |
| 1,499,781 | A | 7/1924 | Pilliod |
| 1,513,132 | A | 10/1924 | Raney |
| 1,519,694 | A | 12/1924 | Muessman |
| 1,541,727 | A | 6/1925 | Meyer |
| 1,565,254 | A | 12/1925 | Leonard |
| 1,661,254 | A | 1/1926 | Gillies |
| 1,732,018 | A | 10/1929 | Jurgensen |
| 1,735,684 | A | 11/1929 | Jurgensen |
| 1,742,775 | A | 1/1930 | Mallay |
| 1,761,793 | A | 6/1930 | Jurgensen |
| 1,838,242 | A | 12/1931 | Wilson |

(Continued)

*Primary Examiner* — Jethro M. Pence

(74) *Attorney, Agent, or Firm* — Bryant J. Keller; John Oldroyd; Kirton McConkie

(57) ABSTRACT

A spray gun cover is made of flashspun high-density polyethylene fibers (e.g., Tyvek), another cloth-like material, plastic, or fabric. The cover is self-sustaining, and an elastic material is disposed at openings of the cover to secure the cover at the nozzle around the nozzle opening of the spray gun cover and at the back of the spray gun around a large opening of the spray gun cover. Through the cover, the paint cup or reservoir and the spray gun are covered and protected from airborne fluid or dry particles that bounce back from the surface of the item being sprayed with paint, stain, or other fluid (overspray). Additionally, an air hose cover is also made of flashspun high-density polyethylene fibers or the like and covers and protects an air hose for a spray gun.

20 Claims, 8 Drawing Sheets

(56) References Cited

U.S. PATENT DOCUMENTS

| | | | |
|---|---|---|---|
| 1,860,131 A | | 5/1932 | Booth |
| 1,860,203 A | | 5/1932 | Rishel |
| 1,876,665 A | | 9/1932 | Greig |
| 1,895,420 A | | 1/1933 | Mottweiler |
| 1,969,374 A | | 8/1934 | Kleffel |
| 1,994,036 A | | 3/1935 | Fehring |
| 2,032,753 A | | 3/1936 | James |
| 2,054,769 A | | 9/1936 | Holtz |
| 2,083,596 A | | 6/1937 | Donley, Sr. |
| 2,160,009 A | | 5/1939 | Walker |
| 2,160,240 A | | 5/1939 | Wallace et al. |
| 2,224,810 A | | 12/1940 | Cumfer |
| 2,243,427 A | | 5/1941 | Kleffel |
| 2,253,848 A | | 8/1941 | Cummings |
| 2,264,967 A | | 12/1941 | Cryor |
| 2,291,568 A | | 7/1942 | Balch |
| 2,291,838 A | | 8/1942 | Shoan |
| 2,308,607 A | | 1/1943 | Jackson |
| 2,311,572 A | | 2/1943 | Reynolds |
| 2,311,573 A | | 2/1943 | Shoan |
| 2,324,181 A | | 7/1943 | Tulien |
| 2,429,993 A | | 11/1947 | Crosby |
| 2,489,121 A | | 11/1949 | Collins |
| 2,555,696 A | | 6/1951 | Krogstade et al. |
| 2,567,607 A | | 9/1951 | Larson |
| 2,641,944 A | | 6/1953 | Laffoon |
| 2,652,018 A | | 9/1953 | Griffith |
| 2,659,026 A | | 11/1953 | Epstein |
| 2,688,895 A | | 9/1954 | Ellwood |
| 2,694,358 A | | 11/1954 | Ralph |
| 2,713,383 A | | 7/1955 | Ted |
| 2,717,848 A | | 9/1955 | Jaye |
| 2,749,608 A | | 6/1956 | Siemer |
| 2,780,896 A | | 2/1957 | Jaye |
| 2,784,129 A | | 3/1957 | Stephens |
| 5,095,576 A | | 3/1992 | Galigan |
| 5,862,989 A | * | 1/1999 | Cirillo .................... B05B 15/50 150/161 |
| 5,933,914 A | | 8/1999 | Beane |
| 6,051,132 A | | 4/2000 | Flores |
| 7,168,451 B1 | | 1/2007 | Dundas |
| 9,379,460 B2 | | 6/2016 | Miyamoto et al. |
| 10,092,151 B2 | | 10/2018 | Asta |
| 11,193,623 B2 | | 12/2021 | Navarro |
| 11,213,842 B2 | | 1/2022 | Hoefte et al. |
| 11,745,203 B2 | | 9/2023 | Cavaness |
| 2004/0140034 A1 | | 7/2004 | Baudoin et al. |
| 2012/0240301 A1 | * | 9/2012 | Gustafsson .......... B23K 37/006 2/16 |
| 2016/0186913 A1 | | 6/2016 | Schatz |
| 2018/0259096 A1 | | 9/2018 | Ragner |
| 2020/0030833 A1 | | 1/2020 | Upper et al. |
| 2020/0222923 A1 | | 7/2020 | Osborne |
| 2021/0052841 A1 | | 2/2021 | Pavini |
| 2022/0170572 A1 | | 6/2022 | Heib |

* cited by examiner

SPRAY GUN AND HOSE COVER

RELATED APPLICATION

This application is a divisional of U.S. patent application Ser. No. 16/830,982, filed Mar. 26, 2020, and entitled "SPRAY GUN AND HOSE COVER"; which is incorporated herein by reference in its entirety.

FIELD

The present invention relates to high-volume low-pressure spray guns and accompanying equipment, and more particularly to a removable cover that acts as a shield over such guns.

BACKGROUND AND RELATED ART

Spray guns, such as high-volume low-pressure (HVLP) spray guns, are commonly used to spray paints and stains on surfaces. One drawback to using a spray gun is that the paint or stain during used is often deposited on the spray gun, the connecting air hose, and/or the operator's hands. A substantial amount of time is therefore spent cleaning the spray gun, the air hose, and/or the operator's hand after each use. To reduce the amount of time spent cleaning, a removable cover is needed that can be easily attached over the spray gun before it is used.

BRIEF SUMMARY OF THE INVENTION

Implementation of the invention provides a cover that is made to act like a shield over a high-volume low-pressure (HVLP) or low-volume low-pressure (LVLP) paint spraying gun and cup or any other paint spraying gun (collectively, hereafter, "spray gun"). The spray gun is capable of spraying a variety of different liquids, including paint, stain, and other fluids. Further implementation of the invention provides a cover that is made to act like a shield over an air hose supplying a spray gun.

The cover of some implementations is made of flashspun high-density polyethylene fibers (e.g., Tyvek), which is a flexible cloth-like material. In other embodiments, the cover is made of another cloth-like material, plastic, or fabric. The cover is self-sustaining, and in some embodiments, an elastic material is disposed at openings of the cover to secure the cover at the nozzle around the nozzle opening of the spray gun cover and at the back of the spray gun around a large opening of the spray gun cover. In other embodiments another type of closure is present to secure the cover at the nozzle and at the back of the spray gun. Through the cover, the paint cup or reservoir and the spray gun are covered and protected from airborne fluid or dry particles that bounce back from the surface of the item being sprayed with paint, stain, or other fluid (overspray).

In some embodiments, the cover is provided as a long tube with openings sized to pass over fittings of an air hose for supplying a spray gun, with closures adapted to secure the opening around the air hose. In some embodiments, the cover for the air hose is combined with the cover for the spray gun.

The cover significantly decreases the amount of cleaning performed as maintenance of the spray gun and/or after each use, thereby saving time and increasing overall equipment life.

According to some implementations of the invention, a spray gun cover includes a body, a nozzle opening formed in the body and adapted to permit passage of a nozzle of a spray gun therethrough, the nozzle opening having a first closure, such that when the nozzle of the spray gun is disposed within the nozzle opening, the first closure of the nozzle opening snugly secures the body around the nozzle of the spray gun, and a large opening formed in the body and adapted to permit passage of at least a cup or reservoir of the spray gun and a body of the spray gun therethrough such that the cup or reservoir and the body of the spray gun are disposed within the body, the large opening having a second closure, such that when the cup or reservoir and the body of the spray gun are disposed within the body, the elastic material of the large opening cinches the large opening smaller, holding the body on the spray gun in a fashion protective against overspray.

In some implementations, the body is formed of a material such as flashspun high-density polyethylene fibers, fabric, or plastic. In some implementations, the first closure is a closure such as an elastic material disposed around the nozzle opening, a tie disposed around the nozzle opening, a hook-and-loop closure disposed around the nozzle opening, a cable tie disposed around the nozzle opening, or a fastener adapted to secure the body around the nozzle opening. In some implementations, the first closure is disposed completely around the nozzle opening. In some implementations, the first closure is disposed only partially around the nozzle opening.

In some implementations, the second closure is a closure such as an elastic material disposed around the large opening, a tie disposed around the large opening, a hook-and-loop closure disposed around at least a portion of the large opening, a cable tie disposed around the large opening, or a fastener adapted to be secured so as to reduce a size of the large opening. In some implementations, the second closure is disposed completely around the large opening. In some implementations, the second closure is disposed only partially around the large opening.

In some implementations, a spray gun and air hose cover kit includes the spray gun cover and an air hose cover. The air hose cover includes a tubular body dimensioned to permit passage of a fitting of an air hose therethrough, a first opening at a first end of the tubular body, a second opening at a second end of the tubular body, and a closure adapted to reduce the size of one of the first opening or the second opening until the air hose cover is generally tightly secured around the air hose at the closure. In some implementations, the closure includes a closure such as a hook-and-loop closure, an elastic closure, a tie closure, a cable tie closure, or a fastener closure. In some implementations, the closure extends partially around one of the first opening or the second opening. In some implementations, the closure extends entirely around one of the first opening or the second opening. In some implementations, the tubular body of the air hose cover is formed of flashspun high-density polyethylene fibers.

According to further implementations of the invention, a spray gun cover includes a body formed of flashspun high-density polyethylene fibers, a nozzle opening formed in the body and adapted to permit passage of a nozzle of a spray gun therethrough, the nozzle opening having an elastic material disposed therearound, such that when the nozzle of the spray gun is disposed within the nozzle opening, the elastic material of the nozzle opening snugly secures the body around the nozzle of the spray gun, and a large opening formed in the body and adapted to permit passage of at least a cup or reservoir of the spray gun and a body of the spray gun therethrough such that the cup or reservoir and the body of the spray gun are disposed within the body, the large opening having an elastic material disposed therearound, such that when the cup or reservoir and the body of the spray gun are disposed within the body, the elastic material of the large opening cinches the large opening smaller, holding the body on the spray gun in a fashion protective against overspray.

In some implementations, the first closure is a closure such as an elastic material disposed around the nozzle opening, a tie disposed around the nozzle opening, a hook-and-loop closure disposed around the nozzle opening, a cable tie disposed around the nozzle opening, and a fastener adapted to secure the body around the nozzle opening. In some implementations, the second closure is a closure such as an elastic material disposed around the large opening, a tie disposed around the large opening, a hook-and-loop closure disposed around at least a portion of the large opening, a cable tie disposed around the large opening, and a fastener adapted to be secured so as to reduce a size of the large opening.

In some implementations, a spray gun and air hose cover kit includes the spray gun cover and an air hose cover. The air hose cover includes a tubular body formed of flashspun high-density polyethylene fibers and dimensioned to permit passage of a fitting of an air hose therethrough, a first opening at a first end of the tubular body, a second opening at a second end of the tubular body, and a closure adapted to reduce the size of one of the first opening or the second opening until the air hose cover is generally tightly secured around the air hose at the closure. In some implementations, the closure includes a closure such as a hook-and-loop closure, an elastic closure, a tie closure, a cable tie closure, or a fastener closure. In some implementations, the closure extends partially around one of the first opening or the second opening. In some implementations, the closure extends entirely around one of the first opening or the second opening. In some implementations, the tubular body of the air hose cover is formed of flashspun high-density polyethylene fibers.

According to further implementations of the invention, an air hose cover includes a generally tubular body dimensioned to allow passage of a fitting of an air hose therethrough, a first opening formed in the body and adapted to permit passage of the fitting therethrough, a second opening formed in the body and adapted to permit passage of the fitting therethrough, and a closure adapted to reduce the size of one of the first opening or the second opening until the air hose cover is generally tightly secured around the air hose at the closure.

In some implementations, the body is formed of flashspun high-density polyethylene fibers. In some implementations, the closure is a closure such as a hook-and-loop closure, an elastic closure, a tie closure, a cable tie closure, and a fastener closure.

In some implementations, an air hose and spray gun cover kit includes the air hose cover and a spray gun cover. The spray gun cover includes a body, a nozzle opening formed in the body and adapted to permit passage of a nozzle of a spray gun therethrough, the nozzle opening having a first closure, such that when the nozzle of the spray gun is disposed within the nozzle opening, the first closure of the nozzle opening snugly secures the body around the nozzle of the spray gun, and a large opening formed in the body and adapted to permit passage of at least a cup or reservoir of the spray gun and a body of the spray gun therethrough such that the cup or reservoir and the body of the spray gun are disposed within the body, the large opening having a second closure, such that when the cup or reservoir and the body of the spray gun are disposed within the body, the elastic material of the large opening cinches the large opening smaller, holding the body on the spray gun in a fashion protective against overspray.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

Figure 1:
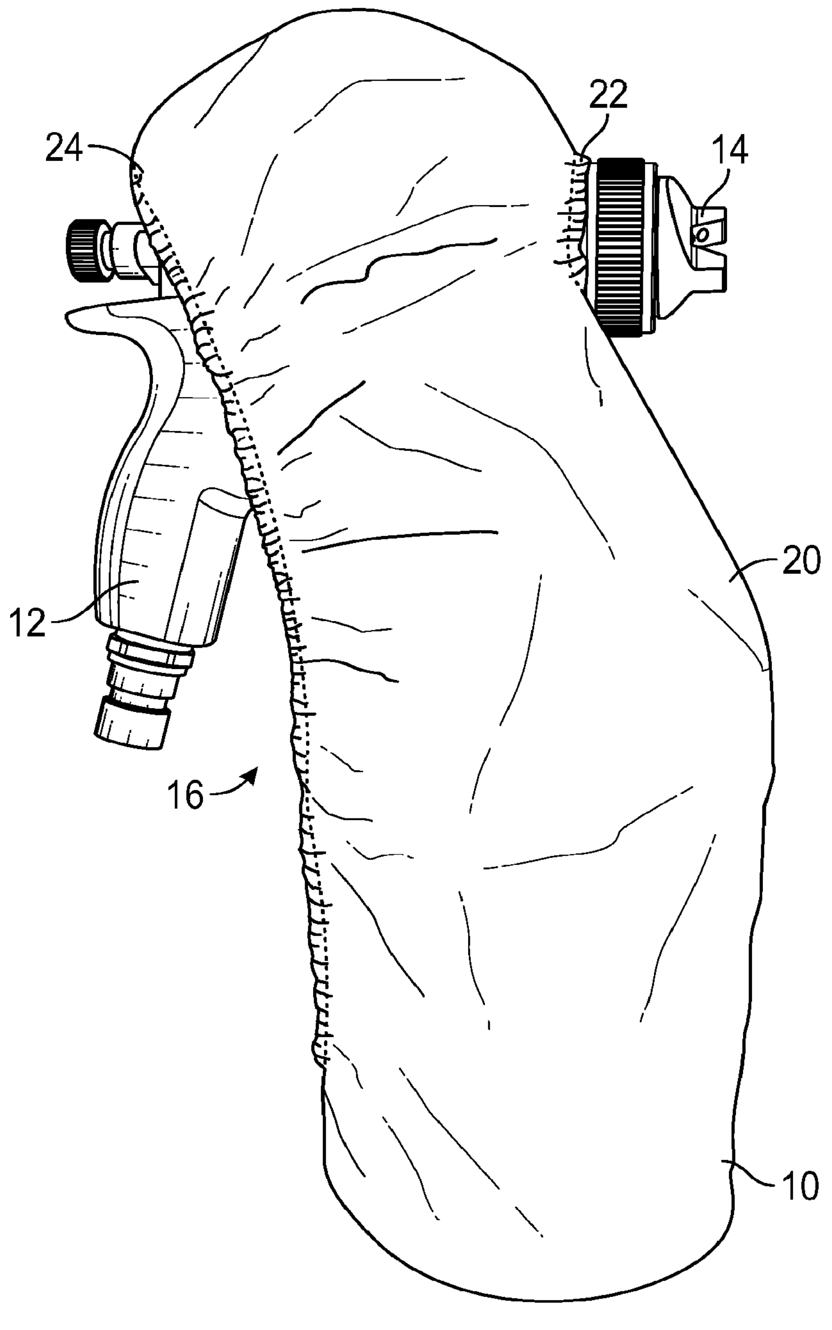
FIG. 1 shows an embodiment of a spray gun cover on a spray gun.

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

According to some embodiments of the invention, a spray gun cover includes a body, a nozzle opening formed in the body and adapted to permit passage of a nozzle of a spray gun therethrough, the nozzle opening having a first closure, such that when the nozzle of the spray gun is disposed within the nozzle opening, the first closure of the nozzle opening snugly secures the body around the nozzle of the spray gun, and a large opening formed in the body and adapted to permit passage of at least a cup or reservoir of the spray gun and a body of the spray gun therethrough such that the cup or reservoir and the body of the spray gun are disposed within the body, the large opening having a second closure, such that when the cup or reservoir and the body of the spray gun are disposed within the body, the elastic material of the large opening cinches the large opening smaller, holding the body on the spray gun in a fashion protective against overspray.

In some embodiments, the body is formed of a material such as flashspun high-density polyethylene fibers, fabric, or plastic. In some embodiments, the first closure is a closure such as an elastic material disposed around the nozzle opening, a tie disposed around the nozzle opening, a hook-and-loop closure disposed around the nozzle opening, a cable tie disposed around the nozzle opening, or a fastener adapted to secure the body around the nozzle opening. In some embodiments, the first closure is disposed completely around the nozzle opening. In some embodiments, the first closure is disposed only partially around the nozzle opening.

In some embodiments, the second closure is a closure such as an elastic material disposed around the large opening, a tie disposed around the large opening, a hook-and-loop closure disposed around at least a portion of the large opening, a cable tie disposed around the large opening, or a fastener adapted to be secured so as to reduce a size of the large opening. In some embodiments, the second closure is disposed completely around the large opening. In some embodiments, the second closure is disposed only partially around the large opening.

In some embodiments, a spray gun and air hose cover kit includes the spray gun cover and an air hose cover. The air hose cover includes a tubular body dimensioned to permit passage of a fitting of an air hose therethrough, a first opening at a first end of the tubular body, a second opening at a second end of the tubular body, and a closure adapted to reduce the size of one of the first opening or the second opening until the air hose cover is generally tightly secured around the air hose at the closure. In some embodiments, the closure includes a closure such as a hook-and-loop closure, an elastic closure, a tie closure, a cable tie closure, or a fastener closure. In some embodiments, the closure extends partially around one of the first opening or the second opening. In some embodiments, the closure extends entirely around one of the first opening or the second opening. In some embodiments, the tubular body of the air hose cover is formed of flashspun high-density polyethylene fibers.

According to further embodiments of the invention, a spray gun cover includes a body formed of flashspun high-density polyethylene fibers, a nozzle opening formed in the body and adapted to permit passage of a nozzle of a spray gun therethrough, the nozzle opening having an elastic material disposed therearound, such that when the nozzle of the spray gun is disposed within the nozzle opening, the elastic material of the nozzle opening snugly secures the body around the nozzle of the spray gun, and a large opening formed in the body and adapted to permit passage of at least a cup or reservoir of the spray gun and a body of the spray gun therethrough such that the cup or reservoir and the body of the spray gun are disposed within the body, the large opening having an elastic material disposed therearound, such that when the cup or reservoir and the body of the spray gun are disposed within the body, the elastic material of the large opening cinches the large opening smaller, holding the body on the spray gun in a fashion protective against overspray.

In some embodiments, the first closure is a closure such as an elastic material disposed around the nozzle opening, a tie disposed around the nozzle opening, a hook-and-loop closure disposed around the nozzle opening, a cable tie disposed around the nozzle opening, and a fastener adapted to secure the body around the nozzle opening. In some embodiments, the second closure is a closure such as an elastic material disposed around the large opening, a tie disposed around the large opening, a hook-and-loop closure disposed around at least a portion of the large opening, a cable tie disposed around the large opening, and a fastener adapted to be secured so as to reduce a size of the large opening.

In some embodiments, a spray gun and air hose cover kit includes the spray gun cover and an air hose cover. The air hose cover includes a tubular body formed of flashspun high-density polyethylene fibers and dimensioned to permit passage of a fitting of an air hose therethrough, a first opening at a first end of the tubular body, a second opening at a second end of the tubular body, and a closure adapted to reduce the size of one of the first opening or the second opening until the air hose cover is generally tightly secured around the air hose at the closure. In some embodiments, the closure includes a closure such as a hook-and-loop closure, an elastic closure, a tie closure, a cable tie closure, or a fastener closure. In some embodiments, the closure extends partially around one of the first opening or the second opening. In some embodiments, the closure extends entirely around one of the first opening or the second opening. In some embodiments, the tubular body of the air hose cover is formed of flashspun high-density polyethylene fibers.

According to further embodiments of the invention, an air hose cover includes a generally tubular body dimensioned to allow passage of a fitting of an air hose therethrough, a first opening formed in the body and adapted to permit passage of the fitting therethrough, a second opening formed in the body and adapted to permit passage of the fitting therethrough, and a closure adapted to reduce the size of one of the first opening or the second opening until the air hose cover is generally tightly secured around the air hose at the closure.

In some embodiments, the body is formed of flashspun high-density polyethylene fibers. In some embodiments, the closure is a closure such as a hook-and-loop closure, an elastic closure, a tie closure, a cable tie closure, and a fastener closure.

In some embodiments, an air hose and spray gun cover kit includes the air hose cover and a spray gun cover. The spray gun cover includes a body, a nozzle opening formed in the body and adapted to permit passage of a nozzle of a spray gun therethrough, the nozzle opening having a first closure, such that when the nozzle of the spray gun is disposed within the nozzle opening, the first closure of the nozzle opening snugly secures the body around the nozzle of the spray gun, and a large opening formed in the body and adapted to permit passage of at least a cup or reservoir of the spray gun and a body of the spray gun therethrough such that the cup or reservoir and the body of the spray gun are disposed within the body, the large opening having a second closure, such that when the cup or reservoir and the body of the spray gun are disposed within the body, the elastic material of the large opening cinches the large opening smaller, holding the body on the spray gun in a fashion protective against overspray.

FIGS. 1-5 illustrate embodiments of a spray gun cover 10 covering embodiments of a spray gun 12. The spray gun 12 has a nozzle 14 or tip through which paint, stain, or other fluid is sprayed onto a desired substrate. The spray gun 12 also has a cup 16 that is adapted to hold paint, stain, or other material to be sprayed by the spray gun 12. The cover 10 greatly reduces or prevents overspray from collecting on the spray gun 12 or its components, including the cup 16, and may also reduce overspray on the operator's hand or hands.

The cover 10 is formed as a body 20 having a nozzle opening 22 that includes an elastic material such that the nozzle 14 may be introduced through the nozzle opening 22 while the elastic of the nozzle opening 22 minimizes the amount of overspray that may land on the spray gun 12 through the nozzle opening 22. The body 20 also has a large opening 24 through which the spray gun 12 may be introduced, including the cup 16. The large opening 24 also includes an elastic material that may be stretched as the spray gun 12 is introduced into the body 20, while the elastic material of the large opening 24 secures the body 20 around the spray gun 12 and the cup 16, minimizing overspray landing on those portions of the spray gun 12, while still providing access to the spray gun 12 by the operator to allow the operator to operate the spray gun 12.

Figure 2:
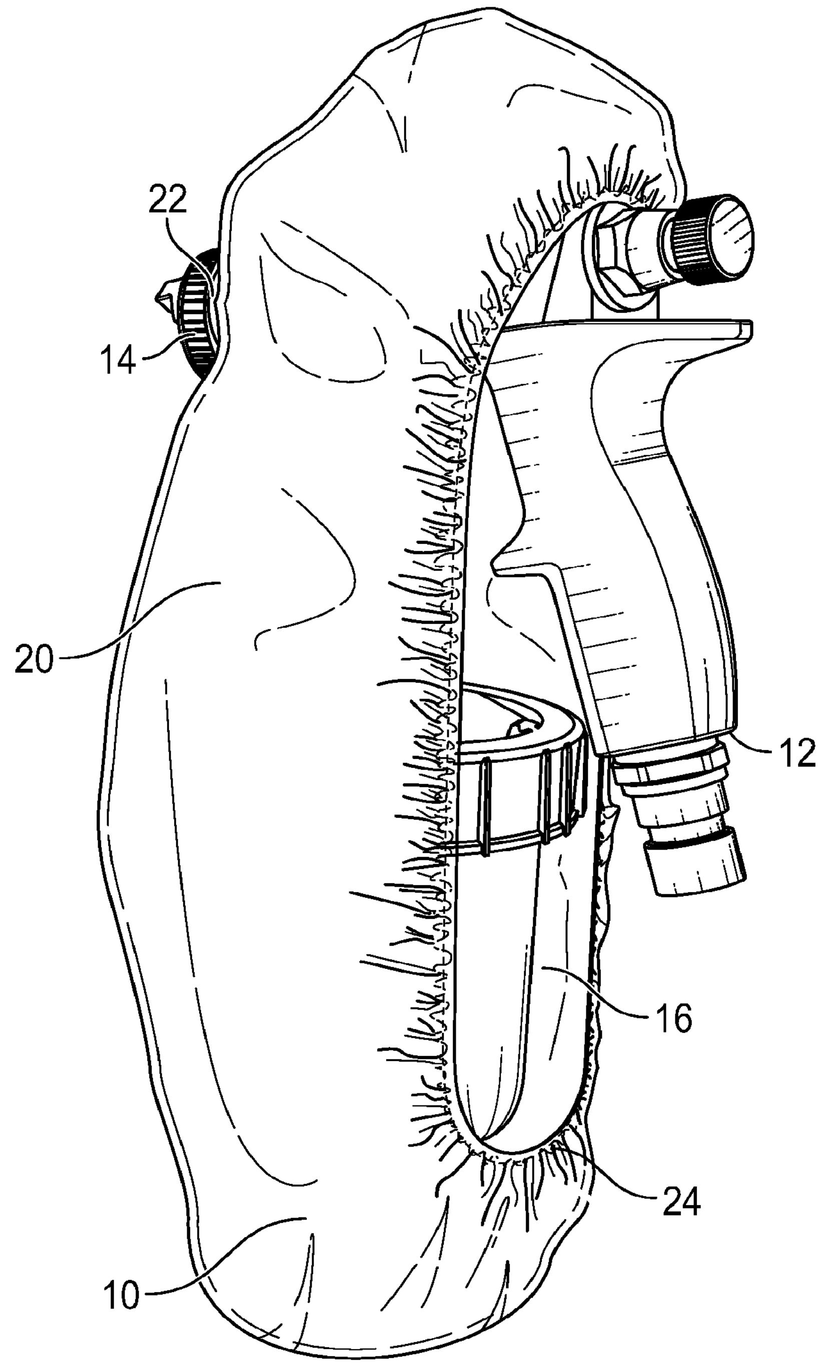
FIG. 2 shows an embodiment of a spray gun cover on a spray gun.
Figure 3:
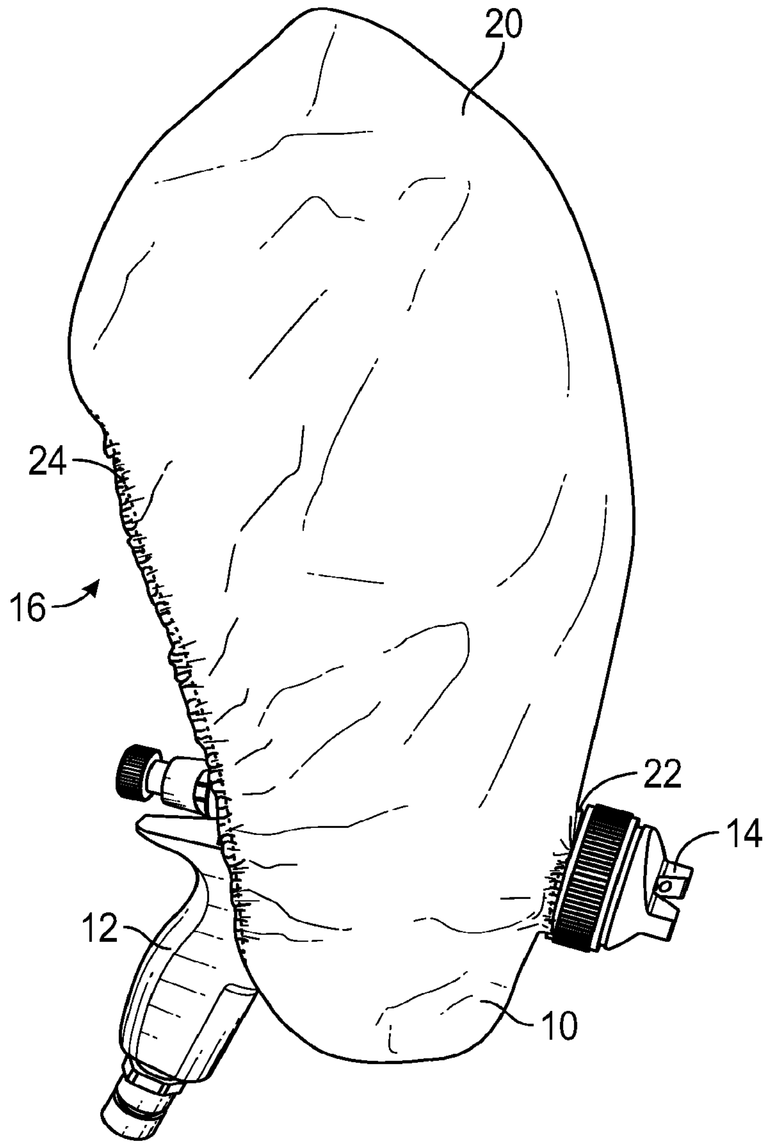
FIG. 3 shows an embodiment of a spray gun cover on a spray gun.
Figure 4:
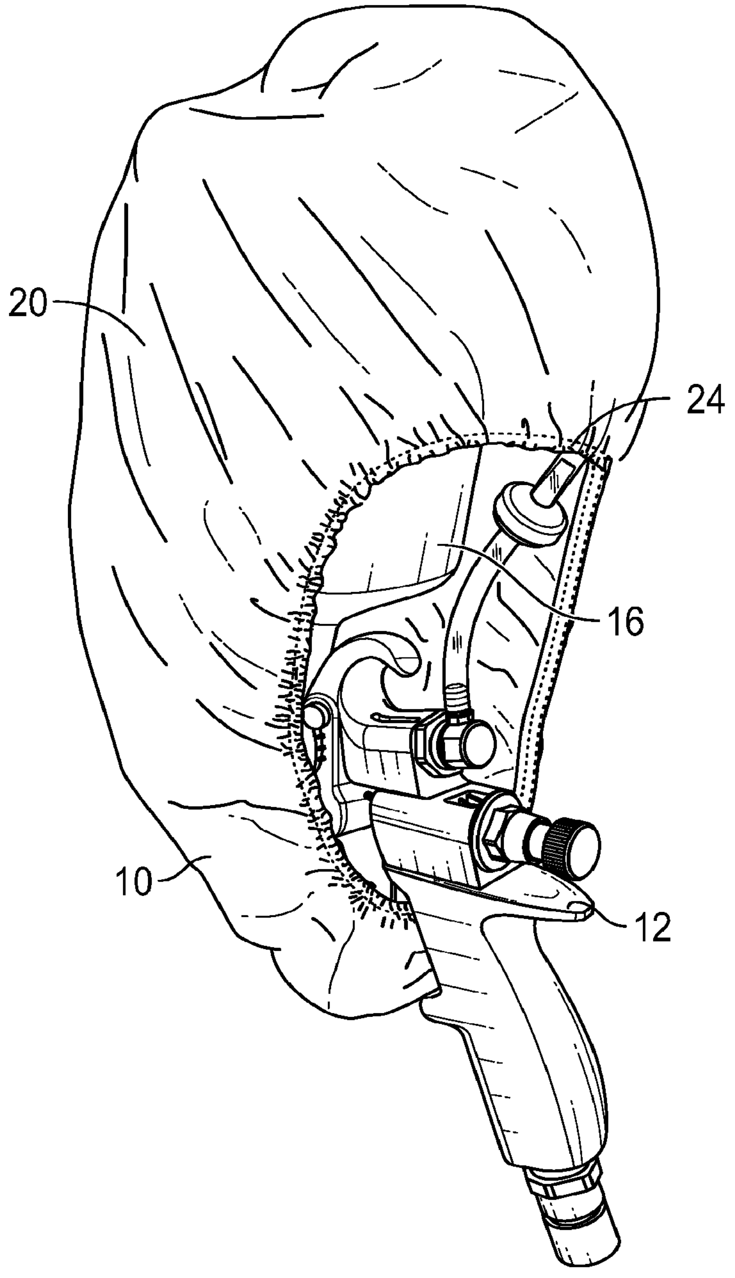
FIG. 4 shows an embodiment of a spray gun cover on a spray gun.
Figure 5:
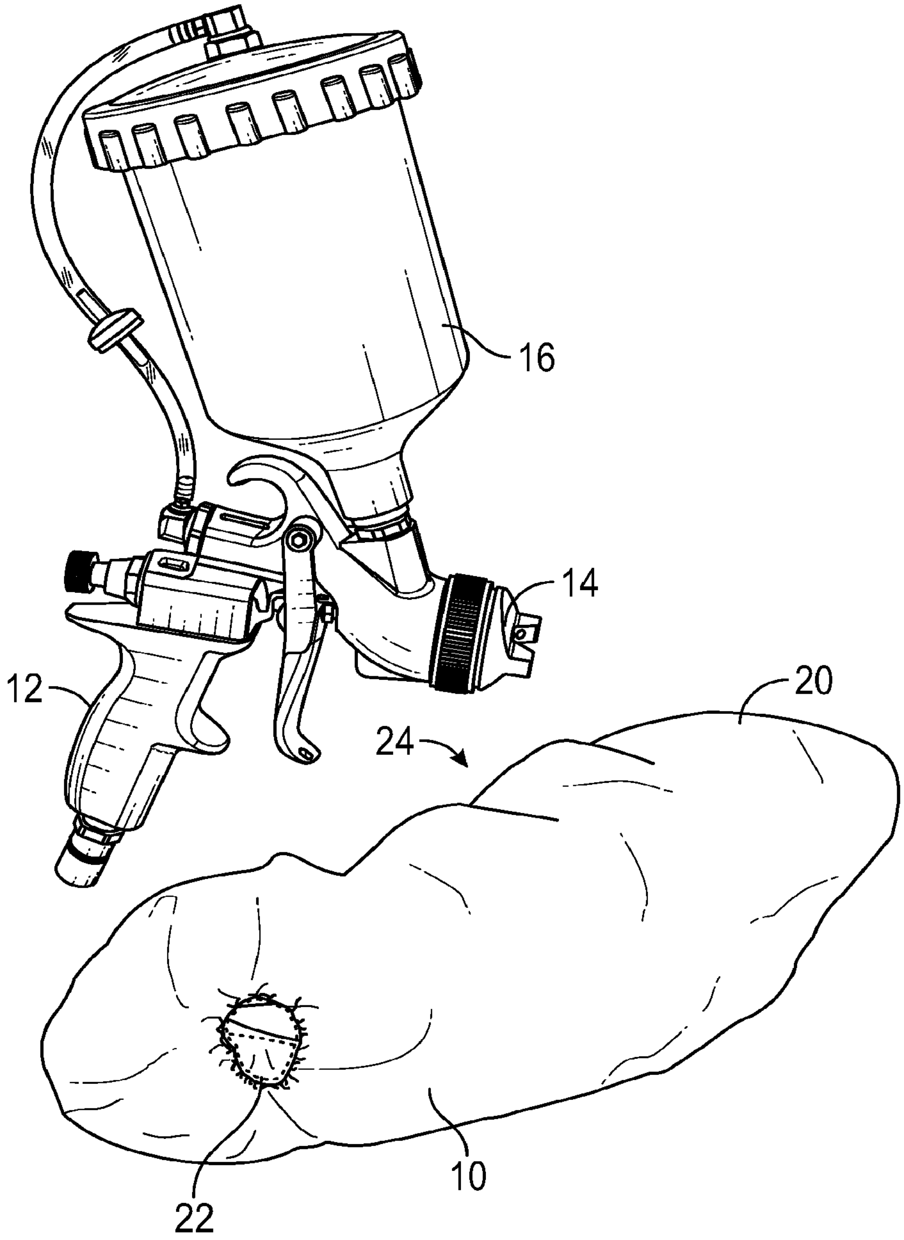
FIG. 5 shows an embodiment of a spray gun cover proximate a spray gun.

As illustrated in FIGS. 1-2, the cover 10 of some embodiments is adapted for use with spray guns 12 where the cup 16 is disposed generally below a body, handle, and/or the nozzle 14 of the spray gun 12. In other embodiments, as illustrated in FIGS. 3-5, the cover 10 is adapted for use with spray guns 12 where the cup 16 is disposed generally above a body, handle, and/or the nozzle 14 of the spray gun 12. Some embodiments of the cover 10 may be adapted for either type of spray gun configuration.

The cover 10 in the illustrated embodiments of FIGS. 1-5 is made of flashspun high-density polyethylene fibers (e.g., Tyvek), which is a flexible cloth-like material. In other embodiments, the cover 10 is made of another cloth-like material, plastic, or fabric.

The cover 10 significantly decreases the amount of cleaning that is performed as maintenance of the spray gun 12 after each use, thereby increasing overall equipment life.

The cover 10 of some embodiments is made from a single piece of material. In other embodiments, the cover 10 is made from multiple pieces of material joined together using any appropriate construction, such as by bonding, sewing, gluing, the use of fasteners, and the like.

The cover 10 of some embodiments forms a generally snug fit over the spray gun 12 and the cup 16 or reservoir. While certain embodiments are shown in FIGS. 1-5, it should be understood that these embodiments are only illustrative, and alternate embodiments, including embodiments sized to fit spray guns and cups or reservoirs larger or smaller than those of the depicted embodiments are embraced as coming within the scope of the invention.

In some embodiments of the cover 10, one or both of the nozzle opening 22 or the large opening 24 are provided with a size-restriction mechanism other than an elastic material. In some embodiments, the elastic material is replaced with a tie such as a thread or twine that may be tightened to restrict the size of the nozzle opening 22 and/or the large opening 24 after introduction of the nozzle 14 or the spray gun 12 therethrough, respectively. Thereafter, the tie may be tied off to maintain the size of the nozzle opening 22 or the large opening 24 at a desired size. When the cover 10 is to be removed or otherwise accessed, the tie may be untied or otherwise loosened to permit removal of the spray gun 12 or removal and replacement of the cup 16 (e.g., for filling or color change, etc.).

In other embodiments, the elastic material of the nozzle opening 22 and/or the large opening 24 is replaced with a reversible fastener. One example of a reversible fastener is a hook-and-loop fastener. A first portion of a reversible fastener in some embodiments is disposed in a channel or at a location surrounding a portion of the nozzle opening 22 and/or the large opening 24, and a second portion of the reversible fastener is disposed at a location of the cover 10 permitting securing of the first portion of the reversible fastener to the second portion of the reversible fastener after cinching down or otherwise reducing the size of the nozzle opening 22 and/or the large opening 24.

In other embodiments of the cover 10, such as in embodiments intended for one-time use (e.g., as a disposable cover), one or both of the nozzle opening 22 and the large opening 24 may be provided with a single-use cinching fastener, such as a cable tie or the like. For example, once the nozzle 14 is disposed in the nozzle opening 22, the single-use cinching fastener is cinched down around the nozzle 14. In one such embodiment, the large opening 24 is provided with the elastic-type large opening 24, such that the cup 16 can be readily accessed and replaced/refilled. In another such embodiment, the large opening 24 is also provided with a cinch-type fastener. When use of the spray gun 12 is complete, the cover 10 can simply be removed and disposed of (including cutting of the fastener or other separation/removal of any portion remaining around or adjacent the nozzle 14).

Regardless of the mechanism used to restrict the size of the nozzle opening 22 and/or the large opening 24, the mechanism so used may extend completely around or only partially around the respective opening 22, 24. For example, in some embodiments, the elastic material only partially surrounds the nozzle opening 22 and/or the large opening 24. In other embodiments, the elastic material completely surrounds the nozzle opening 22 and/or the large opening 24. In some embodiments, the hook-and-loop fastener only partially surrounds the nozzle opening 22 and/or the large opening 24, while in other embodiments, the hook-and-loop fastener completely surrounds the nozzle opening 22 and/or the large opening 24.

Figure 6:
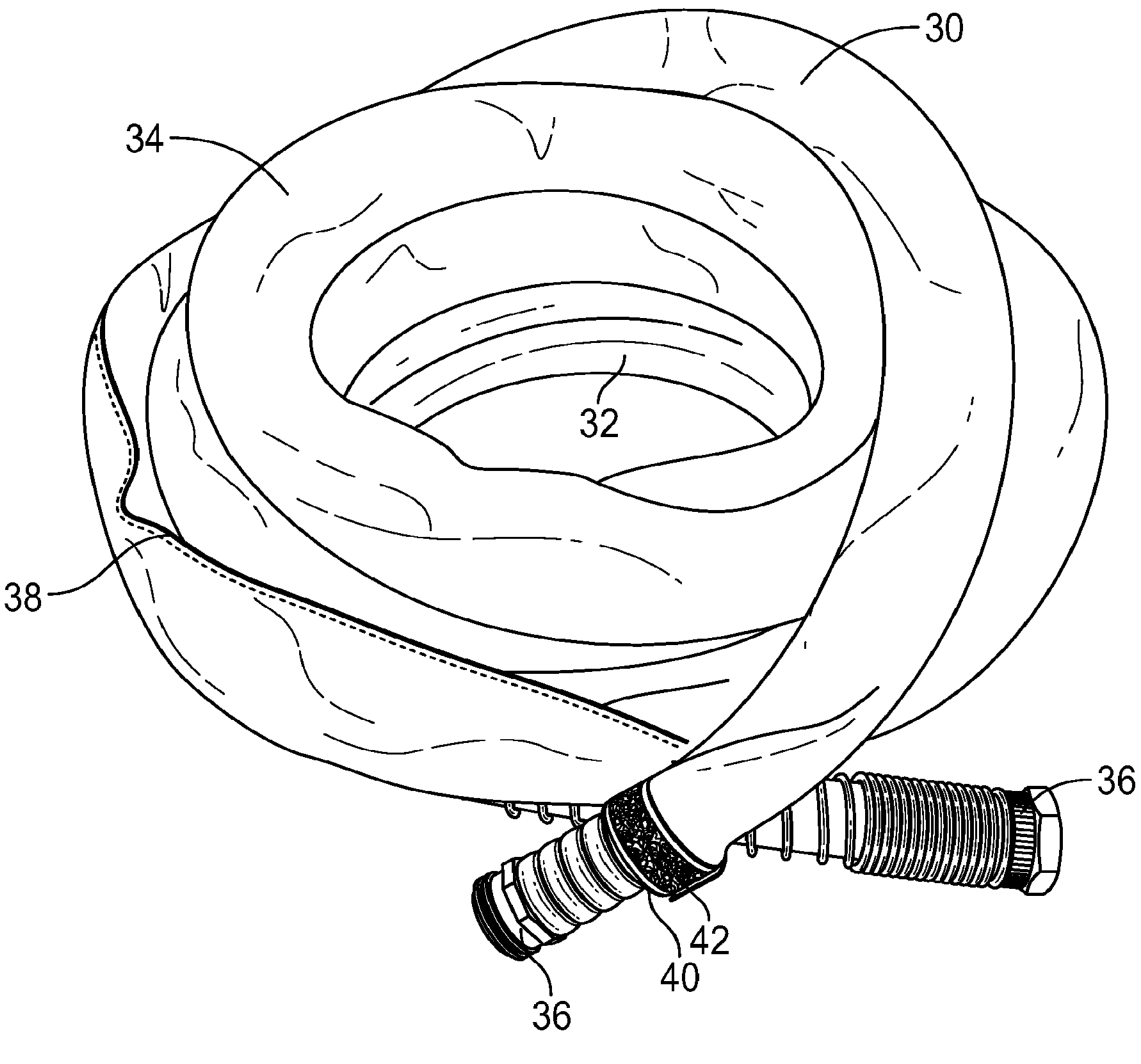
FIG. 6 shows an embodiment of a hose cover on an air hose.
Figure 7:
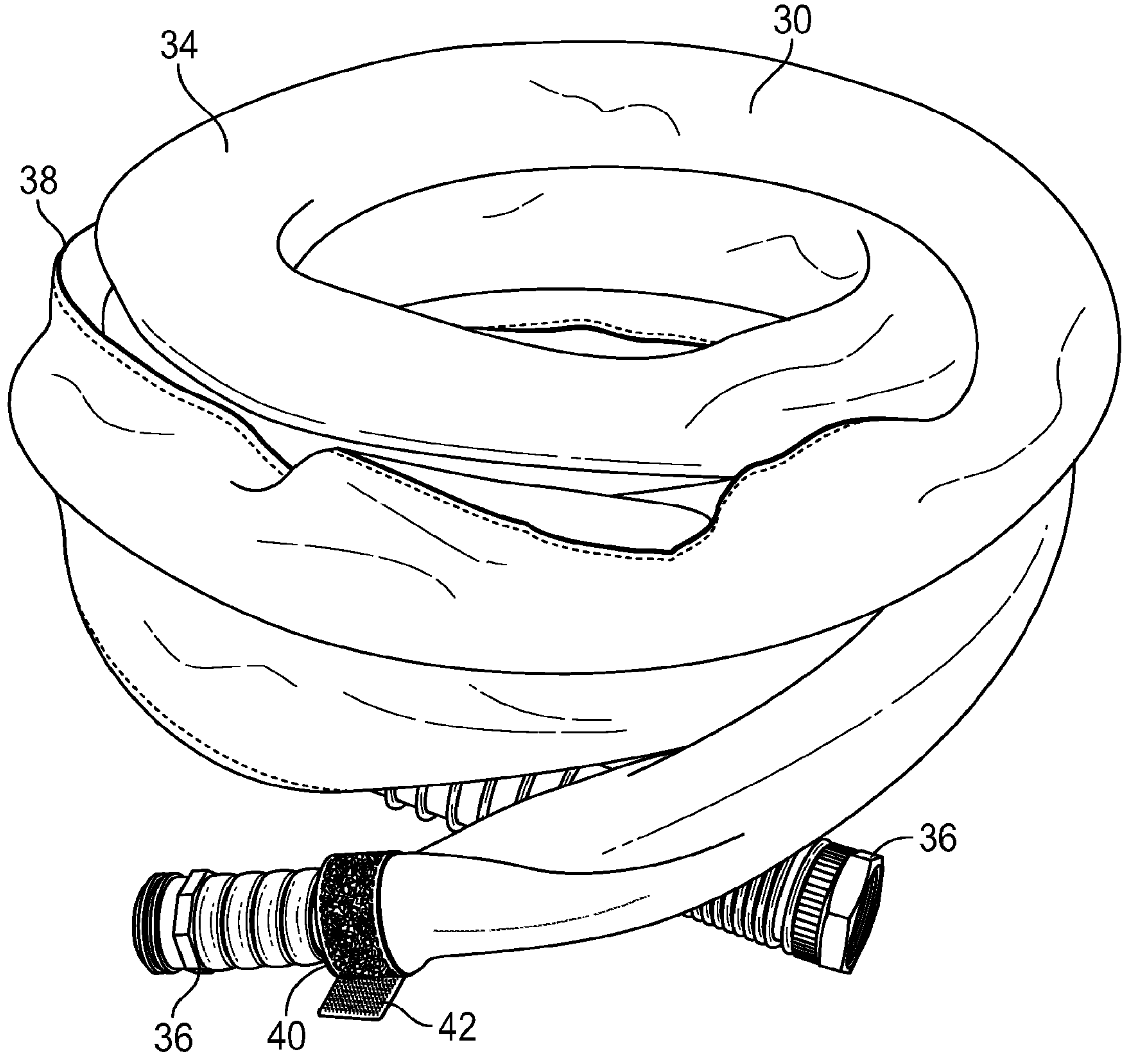
FIG. 7 shows an embodiment of a hose cover on an air hose.
Figure 8:
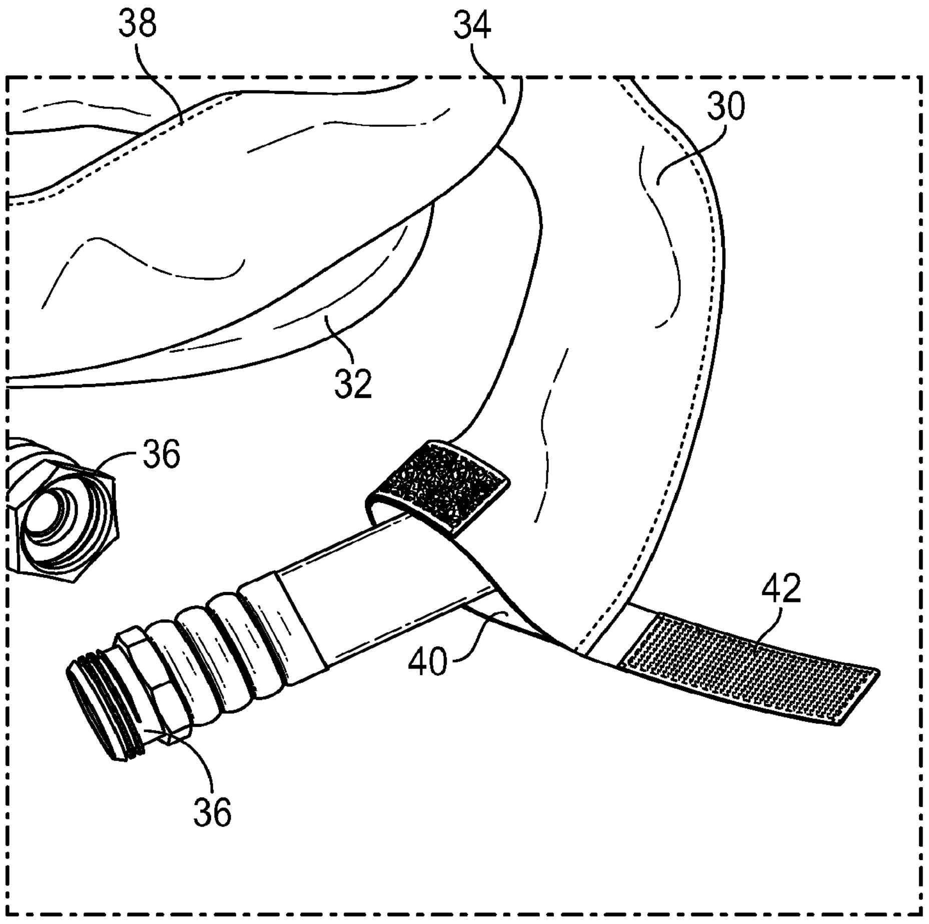
FIG. 8 shows an embodiment of a hose cover on an air hose.

FIGS. 6-8 illustrate embodiments of the invention as incorporated into a cover 30 for an air hose 32. As with the cover 10 illustrated in FIGS. 1-5, the cover 30 of the illustrated embodiments is made of flashspun high-density polyethylene fibers (e.g., Tyvek), which is a flexible cloth-like material. In other embodiments, the cover is made of another cloth-like material, plastic, or fabric.

The cover 30 significantly decreases the amount of cleaning that is performed as maintenance of the air hose 32 after each use, thereby increasing overall equipment life. The air hose 32 is commonly used in conjunction with the spray gun 12, such as to connect the spray gun 12 to an air compressor (not shown), but its use is not limited to use with the spray gun 12.

The cover 30 of some embodiments is made from a single piece of material. In other embodiments, the cover 30 is made from multiple pieces of material joined together using any appropriate construction, such as by bonding, sewing, gluing, the use of fasteners, and the like.

The cover 30 of some embodiments is formed as an elongate body 34 that is dimensioned to pass over one or more fittings 36 of the air hose 32. As may be appreciated, the body 34 of the cover 30 of some embodiments is sized to fit over larger diameter and/or longer air hoses 32, and the body 34 of the cover 30 of other embodiments is sized to fit over smaller diameter and/or shorter air hoses 32.

In some embodiments, the body 34 of the cover 30 is shorter in length than the length of the air hose 32. In such embodiments, the user may determine that only a portion of the air hose 32 is likely to be subject to overspray, and only wishes to cover that portion of the air hose 32. In other embodiments, the body 34 of the cover 30 is approximately equal in length to the length of the air hose 32. In such embodiments, substantially all of the air hose 32 may selectively be covered by the cover 30. In other embodiments, the body 34 of the cover 30 is longer than the length of the air hose 30. In such embodiments, the body 34 of the cover 30 may be bunched over the air hose 32 in places while still continuing to protect the air hose 32 from overspray. Accordingly, it will be understood that embodiments of the cover 30 are not limited in length to any specific length corresponding to a length of any specific air hose 32, and that embodiments of the cover 30 may be used with air hoses 32 of any length. While certain embodiments are shown in FIGS. 6-8, it should be understood that these embodiments are only illustrative, and alternate embodiments, including embodiments sized to fit air hoses larger or smaller than those of the depicted embodiments are embraced as coming within the scope of the invention.

The body 34 of the illustrated cover 30 is formed of a substantially continuous sheet of material that is joined to itself lengthwise at a seam 38. In the illustrated embodiments, the seam 38 is a stitched seam, but the seam 38 of other embodiments is formed using bonding, gluing, or other processes. In some embodiments, the body 34 is woven or formed in a tube shape without any seam 38. Accordingly, the body 38 may be formed using any desirable process.

The body terminates at each end at an opening 40. The opening 40 is sized to allow passage of at least one of the fittings 36 therethrough. To minimize entry of overspray or other contaminants between the cover 30 and the air hose 32, at least one of the openings 40 (e.g., the opening 40 that in use will be proximate the spray gun 12 as opposed to the opening 40 that will be more proximate the air compressor or other compressed air source) is provided with a closure 42. In some embodiments, both openings 40 are provided with some form of the closure 42. The closure 42 may take many forms, such as an elastic closure, a tied closure, etc., but the closure 42 illustrated in FIGS. 6-8 is a hook-and-loop closure that cinches the opening 40 generally tightly around the air hose 32 once the cover 30 is in place, as illustrated in FIG. 6 and FIG. 7. When the closure 42 is open, as illustrated in FIG. 8, the opening 40 is dimensioned approximately equal to the dimension of the body 34, such that the opening 40 can pass over the fitting 36. Opening the closure 42 thereby allows the cover 30 to be removed from the air hose 32 as desired.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed is:

1. A spray gun cover comprising:

a body having a volume configured to accommodate a body of a spray gun, a cup of the spray gun, and a reservoir of the spray gun;

a first opening formed in the body and adapted to permit passage of a nozzle of a of the spray gun therethrough, the first opening having a first closure, such that when the nozzle of the spray gun is disposed within the first opening, the first closure of the first opening secures the body around the nozzle of the spray gun; and a second opening formed in the body and adapted to permit passage of the cup of the spray gun, the reservoir of the spray gun, and the body of the spray gun therethrough, such that the cup of the spray gun, the reservoir of the spray gun, and the body of the spray gun are each disposed within the body, the second opening having a second closure configured to selectively increase and decrease a size of the second opening to thereby allow passage of the cup of the spray gun, the reservoir of the spray gun, and the body of the spray gun into the body and at least partially enclose the cup of the spray gun, the reservoir of the spray gun, and the body of the spray gun therein, thereby shielding the body of the spray gun, the cup of the spray gun, and the reservoir of the spray gun from overspray.

2. The spray gun cover as recited in claim 1, wherein the body is formed of a material comprising flashspun high-density polyethylene fibers.

3. The spray gun cover as recited in claim 1, wherein the first closure comprises an elastic material disposed around the first opening..

4. The spray gun cover as recited in claim 1, wherein the second closure comprises an elastic material disposed around the large second opening.

5. The spray gun cover as recited in claim 1, wherein the second opening is configured to remain partially open when the second closure is in a contracted state, thereby permitting access to the spray gun through the second opening while the spray gun is housed within the body of the spray gun cover.

6. The spray gun cover as recited in claim 5, wherein a diameter of the second opening when the second closure is in the contracted state is greater than a diameter of the first opening.

7. The spray gun cover as recited in claim 1, wherein the body has a configuration in which a distance between the first opening and a second opening is smaller than a distance between a first portion of the second opening and a second portion of the second opening.

8. The spray gun cover as recited in claim 1, wherein the first opening is formed in a front side of the spray gun cover and the second opening is formed in a rear side of the spray gun cover, and wherein the front side of the spray gun cover is configured to cover at least one of the cup of the spray gun, the reservoir of the spray gun, and the body of the spray gun, and the rear side of the spray gun cover is configured to at least partially cover the least one of the cup of the spray gun, the reservoir of the spray gun, and the body of the spray gun to thereby protect the at least one of the cup of the spray gun, the reservoir of the spray gun, and the body of the spray gun against overspray.

9. A spray gun cover comprising:

a body comprising a flexible material, the body having a volume configured to selectively accommodate a reservoir of a spray gun;

a first opening formed in the body and adapted to permit passage of a nozzle of the spray gun therethrough, the first opening having a first closure, such that when the nozzle of the spray gun is disposed within the first opening, the first closure of the first opening secures the body around the nozzle of the spray gun; and a second opening formed in the body and adapted to permit passage of the reservoir of the spray gun therethrough, such that the reservoir of the spray gun is selectively disposed within the body, the second opening comprising:

a diameter that is greater than a diameter of the first opening; and a second closure comprising an elastic element configured to decrease the diameter of the second opening, wherein the second closure is configured to selectively expand to thereby allow passage of the reservoir of the spray gun into the body and at least partially enclose the reservoir of the spray gun therein, thereby shielding the reservoir of the spray gun from overspray.

10. The spray gun cover of claim 9, wherein the body is sufficiently flexible to conform to a shape of the reservoir of the spray gun.

11. The spray gun cover of claim 10, wherein the spray gun cover is collapsible when the reservoir of the spray gun is not disposed therein.

12. The spray gun cover of claim 9, wherein the first opening is disposed in a front side of the spray gun cover, and wherein the second opening is disposed in a rear side of the spray gun cover, and wherein a distance between the front side of the spray gun cover and the rear side of the spray gun cover is smaller than a distance between a top side of the spray gun cover and a bottom side of the spray gun cover.

13. The spray gun cover of claim 12, wherein first opening is disposed closer to the top side of the spray gun cover than to the bottom side of the spray gun cover.

14. The spray gun cover of claim 13, wherein the second opening is disposed closer to the top side of the spray gun cover than to the bottom side of the spray gun cover.

15. The spray gun cover of claim 14, wherein the bottom side of the spray gun cover extends below a bottom edge of the second opening such that a significant portion of the reservoir of the spray gun can be disposed within the body below the bottom edge of the second opening.

16. The spray gun cover of claim 15, wherein the spray gun cover is configured to be interchangeably used right-side-up and upside down, such that the reservoir of the spray gun can be disposed towards a the bottom side of the spray gun cover whether the reservoir of the spray gun is disposed above a body of the spray gun or below a body of the spray gun while the body of the spray gun is in a right-side-up orientation.

17. A spray gun cover comprising:

a body having a volume configured to selectively accommodate a spray gun, the spray gun comprising a spray gun body, a spray gun reservoir, and a spray gun nozzle;

a first opening formed in the body and configured to permit passage of the spray gun nozzle therethrough, the first opening comprising a first closure configured to contract radially to thereby secure the first opening around the spray gun nozzle; and a second opening formed in the body and adapted to permit passage of the spray gun therethrough such that at least the spray gun reservoir is disposed within the body, the second opening comprising a second closure configured to contract radially to thereby decrease a diameter of the second opening to at least partially enclose the spray gun reservoir in the body, thereby shielding the spray gun reservoir from overspray from the spray gun nozzle.

18. The spray gun cover of claim 17, wherein the body is sufficiently flexible to conform to a shape of the spray gun reservoir.

19. The spray gun cover of claim 18, wherein the body comprises flashspun high-density polyethylene fibers.

20. The spray gun cover of claim 18, wherein the body comprises a cloth-like material.

* * * * *